United States Patent
Arita et al.

(10) Patent No.: US 8,590,822 B2
(45) Date of Patent: Nov. 26, 2013

(54) WELDING-WIRE-STORING PAIL PACK, CONTAINER FOR PAIL PACK, AND PRESSING MEMBER FOR PAIL PACK

(75) Inventors: Hiroshi Arita, Fujisawa (JP); Satoshi Ando, Fujisawa (JP); Keishuku Araki, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 348 days.

(21) Appl. No.: 12/955,608

(22) Filed: Nov. 29, 2010

(65) Prior Publication Data

US 2011/0155739 A1    Jun. 30, 2011

(30) Foreign Application Priority Data

Dec. 25, 2009 (JP) ................................. 2009-296335

(51) Int. Cl.
*B65H 57/02* (2006.01)

(52) U.S. Cl.
USPC ........ 242/171; 242/172; 242/566; 242/588.6; 242/615.3; 242/615.4

(58) Field of Classification Search
USPC .............. 242/170, 171, 172, 566, 588, 588.3, 242/588.6, 615, 615.3, 615.4, 129, 157 R
See application file for complete search history.

(56) References Cited

U.S. PATENT DOCUMENTS

| | | | |
|---|---|---|---|
| 2,479,826 | A | 8/1949 | Frick et al. |
| 6,745,899 | B1 | 6/2004 | Barton |
| 2002/0000391 | A1 | 1/2002 | Kawasai et al. |
| 2004/0173703 | A1 | 9/2004 | Barton |
| 2009/0107867 | A1 | 4/2009 | Bang et al. |

FOREIGN PATENT DOCUMENTS

| | | |
|---|---|---|
| JP | 58-82956 A | 5/1983 |
| JP | 60-5776 U | 1/1985 |
| JP | 62-79762 U | 5/1987 |
| JP | 1-99861 U | 7/1989 |
| JP | 2003-238030 | 8/2003 |
| JP | 2005-169449 | 6/2005 |
| JP | 2005-169468 | 6/2005 |
| JP | 2007-927 | 1/2007 |
| JP | 2007-29971 | 2/2007 |
| JP | 2007-29971 A | 2/2007 |
| JP | 2009-107021 | 5/2009 |
| KR | 10-0912861 B1 | 8/2009 |

OTHER PUBLICATIONS

Machine Translation of JP 2003-238030 A.*

(Continued)

*Primary Examiner* — William E Dondero
(74) *Attorney, Agent, or Firm* — Oblon, Spivak, McClelland, Maier & Neustadt, L.L.P.

(57) ABSTRACT

A welding-wire-storing pail pack is provided in which a pressing member includes an annular body positioned on a coil of welding wire, a pressing margin extending from a position on an underside of the body at an inner peripheral edge of the coil toward an axis of the coil, and a projection provided on an inner peripheral edge of the pressing margin in such a manner as to project downward. The body has an inner diameter of 200 to 470 mm. A gap of 10 mm at the minimum is provided between an inner shell and the body. The pressing member weighs 600 to 2000 g. Thus, the wire is prevented from being tangled and/or kinked when being pulled out, and the occurrence of decoiling failure is prevented.

6 Claims, 8 Drawing Sheets

(56) References Cited

OTHER PUBLICATIONS

Office Action issued Aug. 9, 2012 in Korean Patent Application No. 10-2010-0133416 (with English-language translation).
Extended European Search Report issued on Mar. 17, 2011 in corresponding European Application No. 10 01 5267.
Notification of Reason(s) for Refusal issued Dec. 20, 2011 in Japanese Patent Application No. 2009-296335 (with English translation).
Combined Chinese Office Action and Search Report issued Oct. 9, 2012 in Patent Application No. 201010589845.0 with English Translation and English Translation of Category of Cited Documents.

* cited by examiner

WIRE IS BOUND AROUND INNER SHELL

WELDING-WIRE-STORING PAIL PACK, CONTAINER FOR PAIL PACK, AND PRESSING MEMBER FOR PAIL PACK

BACKGROUND OF THE INVENTION

1. Field of the Invention

The present invention relates to a welding-wire-storing pail pack in which a coil of welding wire is stored such that the axis thereof extends vertically, a container intended for the welding-wire-storing pail pack, and a pressing member intended for the welding-wire-storing pail pack and to be placed on the coil of welding wire, and more particularly to a welding-wire-storing pail pack in which welding wire is prevented from coming off the coil while being pulled out, a container for the pail pack, and a pressing member for the pail pack.

2. Description of the Related Art

A cylindrical container that stores welding wire dropped thereinto in such a manner as to make loops is referred to as a pail pack container. A pail pack container stores a large volume of welding wire and is used when the welding wire is transported to the user. In general, welding wire stored in a pail pack container weighs as heavy as 200 to 500 kg.

The welding wire is decoiled in such a manner as to be pulled upward from the coil of the welding wire wound in such a manner as to make loops. Therefore, to prevent the decoiled portion of the wire from being twisted, the welding wire is dropped into a pail pack container in such a manner as to be twisted in a direction opposite to the direction of the twist occurring when the wire is decoiled. To prevent the wire twisted in such a manner from jumping while being decoiled, an annular pressing plate is placed on the top of the coil of the welding wire. That is, the jumping of the wire is prevented under the weight of the pressing plate applied to the coil of the wire from above.

FIGS. 4A and 4B are a schematic perspective view and a vertical cross-sectional view, respectively, of a known welding-wire-storing pail pack. As shown in FIGS. 4A and 4B, a coil 30 of welding wire 3 is placed in a pail pack container 2 by windingly dropping the welding wire 3 into the pail pack container 2. An inner shell 2a extends on the inner side of the coil 30. An annular pressing plate 10 is placed on the coil 30. The coil 30 is pressed from above under the weight of the pressing plate 10, whereby the welding wire 3 is prevented from jumping. When the welding wire 3 is used, the welding wire 3 is pulled out of the gap between the inner shell 2a and the pressing plate 10.

When the welding wire 3 is decoiled from the coil 30, the welding wire 3 may be tangled or kinked. To prevent the tangling and kinking of the decoiled portion of the welding wire 3, pressing plates of various configurations have been proposed. For example, Japanese Unexamined Patent Application Publication No. 2005-169468 discloses a pail pack container in which the outer shell is secured at the bottom end thereof to the bottom plate by caulking, and a pressing plate includes a lower portion whose outer diameter is smaller than the inner diameter of the caulked portion and an upper portion whose outer diameter is larger than the inner diameter of the caulked portion but is smaller than the inner diameter of a portion other than the caulked portion. Thus, the pressing plate is prevented from being caught by the caulked portion while the welding wire is being decoiled, and the welding wire is decoiled to the bottommost turn without being tangled and kinked.

Japanese Unexamined Patent Application Publications No. 2007-029971 and No. 2007-000927 each disclose a technique in which the pressing plate includes a flat portion and a barrier portion provided on the outer periphery of the flat portion and extending upward, whereby welding wire is prevented from coming out of the gap between the pressing plate and the outer shell, and disturbance of the coil is thus prevented.

Welding wire is decoiled such that the wire is pulled out of the gap between the pressing plate and the inner shell. Therefore, in a welding-wire-storing pail pack such as those disclosed in Japanese Unexamined Patent Application Publications No. 2005-169468, No. 2007-029971, and No. 2007-000927 in which the wire is coiled up to a position in close proximity to the outer periphery of the inner shell, a decoiled portion of the wire may be bound around the inner shell, causing decoiling failure. Therefore, as shown in FIG. 5, a gap of a specific size is provided between the coil 30 and the inner shell 2a, whereby decoiling failure due to such wire binding is prevented. Nevertheless, the welding wire 3 wound into the coil 30 may slip off (come off) into the gap between the coil 30 and the inner shell 2a when the welding wire 3 is being decoiled. The come-off of the wire occurs because of repeated twisting of the wire occurring when the wire is decoiled or the interference between the decoiled portion of the wire and the wound portion of the wire below the decoiled portion. As described above, when welding wire is dropped into a pail pack container, the wire is twisted in a direction opposite to the direction of the twist occurring when the wire is decoiled. Therefore, as shown in FIG. 6A, the welding wire that has come off may move circularly because of the twist and may rise over the inner shell 2a. As the welding wire 3 continues to be decoiled, referring now to FIG. 6B, the wire may be bent, i.e., kinked, resulting in decoiling failure. If the wire is kinked, welding work needs to be suspended and, after the wire is cut at the kinked portion, to be started again. This may reduce the efficiency of welding work. If the pail pack is replaced so as to restart the welding work, the welding wire in the pail pack that has been kinked is wasted.

Even in the case where a gap of a specific size is provided between the coil and the inner shell, if the welding wire slips off, referring now to FIG. 7A, the welding wire 3 that has been excessively decoiled from the coil 30 may run around the inner shell 2a and is tightly bound around the inner shell 2a as shown in FIG. 7B, resulting in decoiling failure.

An exemplary technique of preventing the occurrence of welding-wire-decoiling failure is disclosed in Japanese Unexamined Patent Application Publication No. 2003-238030. FIG. 8 schematically shows the known technique of preventing the occurrence of welding-wire-decoiling failure. As shown in FIG. 8, in the technique disclosed in Japanese Unexamined Patent Application Publication No. 2003-238030, the outer diameter of the inner shell 2a provided on the inner side of the coil 30 is small, whereas the width of the pressing plate 10 is significantly extended toward the inner shell 2a, whereby the weight of the pressing plate 10 applied to the inner portion of the coil 30 is made larger than that applied to the outer portion of the coil 30. Thus, the welding wire 3 is prevented from slipping off.

Even with such a pressing plate 10, the come-off of the welding wire 3 into the gap between the inner shell 2a and the coil 30 cannot be prevented sufficiently. Consequently, decoiling failure due to the occurrence of kink and the welding wire bound around the inner shell cannot be prevented.

SUMMARY OF THE INVENTION

In light of the above, it is an object of the present invention to provide a pressing member for a pail pack, a container for a pail pack, and a welding-wire-storing pail pack that prevent wire from being tangled and/or kinked when the wire is decoiled, and thus prevent the occurrence of decoiling failure.

A first aspect of the present invention provides a welding-wire-storing pail pack including a container in which an inner shell and an outer shell are coaxially provided on a bottom plate, a coil of welding wire stored in a space between the inner shell and the outer shell, and a pressing member preventing the welding wire from jumping when the welding wire is decoiled. The welding wire is used by being pulled out of a gap between the pressing member and the inner shell. The pressing member includes an annular body positioned on the welding wire, a pressing margin extending from a position on an underside of the body at an inner peripheral edge of the coil toward an axis of the coil, and a projection provided on an inner peripheral edge of the pressing margin in such a manner as to project downward. The body of the pressing member has an inner diameter of 200 to 470 mm. A gap of 10 mm at the minimum is provided between an outer periphery of the inner shell and an inner periphery of the body of the pressing member. The pressing member weighs 600 to 2000 g. The pressing margin has a width of 5 to 135 mm. The projection has a length of 0.3 to 1.5 mm and a width of 1 to 10 mm.

In the above welding-wire-storing pail pack, the body of the pressing member is, for example, flat in the entirety thereof. Alternatively, the body of the pressing member includes a flat portion and a barrier portion, the barrier portion being raised from an outer periphery of the flat portion and having a step-like shape with a lower portion thereof having a smaller diameter than an upper portion thereof.

The projection of the pressing member preferably has a curved projecting surface. Furthermore, the projection of the pressing member may have, on a side thereof near a center axis of the body, a sloping surface whose inner diameter becomes smaller from the bottom to the top thereof.

Second and third aspects of the present invention provide a container intended for the above welding-wire-storing pail pack and a pressing member intended for the above welding-wire-storing pail pack, respectively.

In the welding-wire-storing pail pack according to the above aspects of the present invention, the inner diameter of the body of the pressing member positioned on the welding wire is optimized, the pressing margin is provided on the underside of the body in such a manner as to extend from the inner peripheral edge of the coil toward the axis of the coil, and the projection projects downward from the inner peripheral edge of the pressing margin. The welding wire is pulled along the pressing margin toward the axis of the coil, rides over the projection from below, and is pulled out upward. Thus, the pressing member presses the wire from above at the pressing margin provided on the underside thereof, and the projection presses the wire in an obliquely outward direction from the side thereof near the center axis of the coil so that the wire that is being decoiled does not move irregularly. Therefore, the path along which the wire is decoiled is maintained to be constant under the pressing member. Hence, even if the position from which the wire is decoiled is shifted in the peripheral direction of the coil, the occurrence of come-off of the wire due to irregular behavior of the decoiled wire is suppressed. Consequently, the wire is prevented from being tangled and/or kinked, and the occurrence of decoiling failure is prevented.

In the above aspects of the present invention, the weight of the pressing member is set so as to be within an appropriate range. Therefore, the force with which the wire is pressed from above is set so as to be within an appropriate range, and the wire is prevented from undergoing plastic deformation due to an excessive pressing force that may be applied when the wire is decoiled.

Thus, in the welding-wire-storing pail pack according to the above aspects of the present invention, the wire is prevented from being tangled and/or kinked, and the occurrence of decoiling failure is prevented.

DESCRIPTION OF THE PREFERRED EMBODIMENTS

Figure 1A:
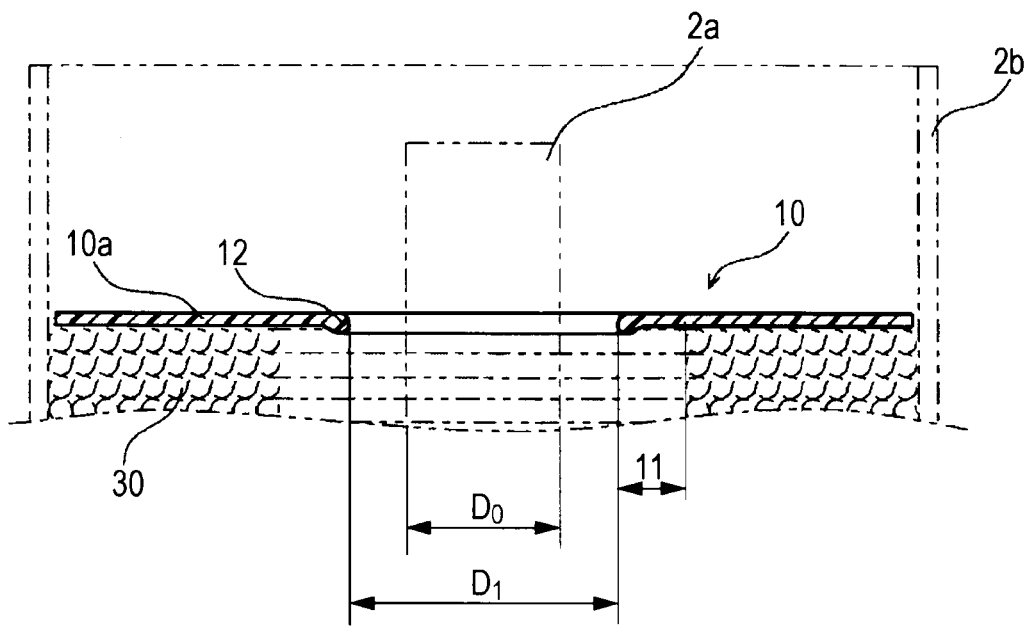
FIGS. 1A and 1B are cross-sectional views showing a pressing member included in a welding-wire-storing pail pack according to a first embodiment of the present invention.
Figure 1B:
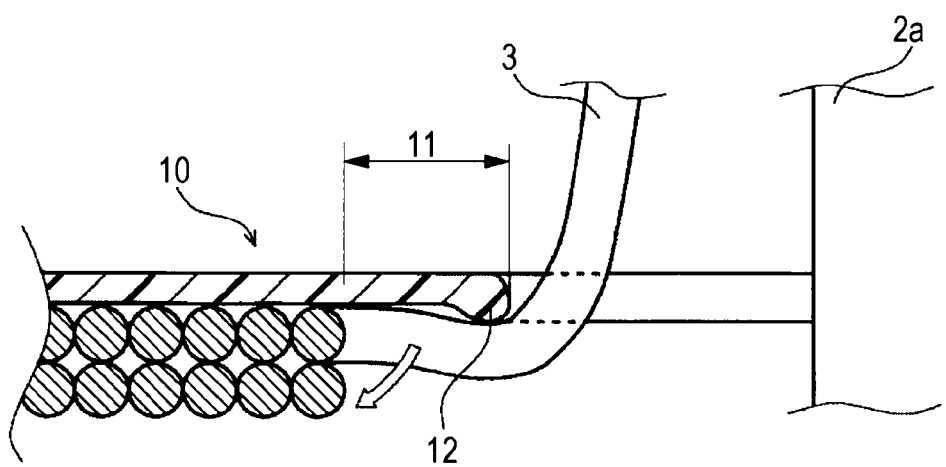

Embodiments of the present invention will now be described in detail with reference to the accompanying drawings. First, the configuration of a welding-wire-storing pail pack according to a first embodiment of the present invention will be described. FIGS. 1A and 1B are cross-sectional views showing a pressing member included in the welding-wire-storing pail pack according to the first embodiment. FIG. 1A is a cross-sectional view showing the entirety of the pressing member. FIG. 1B is an enlarged view showing a projection in a state where wire is being decoiled.

A pail pack container 2 is configured such that, for example, a disc-like bottom plate is secured to the bottom end of a cylindrical outer shell 2b by caulking, that is, the bottom plate is held on the bottom edge of the outer shell 2b. Therefore, the inner diameter of the outer shell 2b is reduced in the caulked portion at the bottom end. The bottom plate and the outer shell 2b are secured to each other in a reinforcing manner with a metal reinforcing band (not shown) covering the caulked portion of the outer shell 2b and the surface of the bottom plate. In general, the pail pack container 2 stores a volume of welding wire weighing 200 to 500 kg and is required to be safe and strong while being transported and being suspended for transportation. From the viewpoints of weight reduction and electric insulation, the outer shell 2b of the pail pack container 2 according to the first embodiment is made of thick paper or the like.

The pail pack container 2 according to the first embodiment includes, on the inner side of the outer shell 2b, a cylindrical inner shell 2a having a smaller diameter than the outer shell 2b and provided coaxially with the outer shell 2b. The bottom end of the inner shell 2a is secured to the bottom plate. A coil 30 of welding wire 3 is placed on the bottom plate between the outer shell 2b and the inner shell 2a. The coil 30 of the welding wire 3 stored in such a state is formed by dropping the welding wire 3, in such a manner as to form loops, into a space between the inner shell 2a and the outer shell 2b while twisting the welding wire 3 by about 360 degrees per turn.

In the first embodiment, as shown in FIGS. 1A and 1B, the inner shell 2a of the pail pack container 2 has an outer diameter $D_0$ of 180 to 450 mm, for example, and the outer shell 2b has an inner diameter of 500 to 650 mm, for example. The welding wire 3 is coiled upward between the inner shell 2a and the outer shell 2b such that the coil 30 of the welding wire 3 occupies a space having a width of 70 to 95 mm from the inner surface of the outer shell 2b.

A pressing member 10 is placed on the coil 30 coaxially with the inner shell 2a and the outer shell 2b. The coil 30 is pressed from above under the weight of the pressing member 10, whereby the welding wire 3 is prevented from jumping. In the first embodiment, the pressing member 10 includes an annular flat portion 10a. The flat portion 10a has on the underside thereof a pressing margin 11 and a projection 12. The pressing margin 11 extends from a position at the inner peripheral edge of the coil 30 toward the axis of the coil 30. The projection 12 is provided at the inner peripheral edge of the pressing margin 11 in such a manner as to project downward. The projection 12 prevents the welding wire 3 from coming off the coil 30.

Preferable materials and dimensions of the pressing member 10 included in the welding-wire-storing pail pack configured as above will now be described. The pressing member 10 including the flat portion 10a and the projection 12 is an integral mold of olefinic resin. The pressing member 10 has a thickness of as thin as 0.5 to 5 mm. Exemplary olefinic resins include acrylonitrile-butadiene-styrene (ABS) resin, polypropylene (PP) resin, polystyrene (PS) resin, and the like. Such an olefinic resin is molded by injection or the like, whereby the pressing member 10 is obtained. The projection 12 projects from the flat portion 10a by a length of 0.3 to 1.5 mm, for example, with a width of 1 to 10 mm, for example. In the first embodiment of the present invention, the pressing member 10 weighs 600 to 2000 g, or preferably 1000 to 2000 g. The materials and dimensions given above are only exemplary. The present invention is not limited to such materials and dimensions, as long as the inner diameter of the flat portion 10a and the weight of the pressing member 10 are within the ranges specified herein.

As shown in FIGS. 1A and 1B, the flat portion 10a of the pressing member 10 according to the first embodiment of the present invention has an inner diameter $D_1$ of 200 to 470 mm. Accordingly, the gap provided between the inner shell 2a of the pail pack container 2 and the flat portion 10a of the pressing member 10 is 10 mm or smaller. That is, provided that the outer diameter $D_0$ of the inner shell 2a is 180 to 450 mm as described above, the inner diameter $D_1$ of the flat portion 10a is to be determined such that the gap provided between the inner shell 2a and the flat portion 10a of the pressing member 10 is 10 mm or larger.

In the first embodiment, the outer diameter of the flat portion 10a is 490.0 to 649.4 mm, for example. Hence, the gap between the inner surface of the outer shell 2b and the flat portion 10a is to be 0.3 to 5 mm.

In the first embodiment of the present invention, the flat portion 10a has along the inner periphery thereof the pressing margin 11 below which no portion of the coil 30 resides, on the basis of the relationship between the width of the coil 30 and the inner diameter of the pressing member 10. The width of the pressing margin 11 is 5 to 135 mm, for example. If the width of the pressing margin 11 is smaller than 5 mm, the contact area between the welding wire 3 and the pressing member 10 is too small, and the welding wire 3 is not sufficiently restrained. Consequently, irregular behavior of the welding wire 3 is not suppressed. If the width of the pressing margin 11 exceeds 135 mm, the contact area between the welding wire 3 and the pressing member 10 is too large, and the welding wire 3 is excessively restrained. Consequently, the linearity of the welding wire 3 is reduced.

The projection 12 provided along the inner peripheral edge of the pressing margin 11 projects from the underside of the pressing member 10 by a length of 0.3 to 1.5 mm, or more preferably 0.6 mm. The width of the projection 12 is 1 to 10 mm, or more preferably 3 mm. By setting the length and width of the projection 12 within the respective ranges specified above, the welding wire 3 is pressed by the pressing member 10 more assuredly. If the length of the projection 12 is so small as to fall below 0.3 mm, the effect of restraining the welding wire 3 is insufficient. Consequently, irregular behavior of the welding wire 3 may not be suppressed. If the length of the projection 12 is so large as to exceed 1.5 mm, a portion of the welding wire 3 that comes into contact with the projection 12 may be deformed. Consequently, the linearity of the welding wire 3 may be reduced. If the width of the projection 12 is so small as to fall below 1 mm, the effect of restraining the welding wire 3 is insufficient. Consequently, irregular behavior of the welding wire 3 may not be suppressed. If the width of the projection 12 is so large as to exceed 10 mm, the contact area between the welding wire 3 and the projection 12 is too large, and the stress applied from the projection 12 to the welding wire 3 is too small. Therefore, the effect of restraining the welding wire 3 is insufficient. Consequently, irregular behavior of the welding wire 3 may not be suppressed.

The projection 12 preferably has a curved projecting surface. If the welding wire 3 is decoiled in such a manner as to be in surface contact with the projection 12, the welding wire 3 is more assuredly pressed. In such a case, the curvature of the projecting surface is defined as an arc whose radius is 0.3 to 5.0 mm, for example, or more preferably 2.5 mm.

The first embodiment of the present invention is intended for wires whose diameters range from 0.6 to 2.4 mm. The length and width of the projection 12, the width of the pressing margin 11, and the gap between the outer periphery of the inner shell 2a and the inner periphery of the flat portion 10a of the pressing member 10 are set so as to be most suitable for wires having the foregoing diameters.

The behavior of the welding-wire-storing pail pack configured as above will now be described. The welding wire 3, such as solid wire or flux-cored wire, is dropped onto the bottom plate exposed between the outer shell 2b and the inner shell 2a, whereby a coil 30 of the welding wire 3 is stored. The coil 30 has a volume of 200 to 500 kg, for example. As shown in FIG. 1B, the pressing member 10 is placed on the coil 30, and the welding wire 3 is pulled upward from the gap between the inner periphery of the pressing member 10 and the outer periphery of the inner shell 2a.

The welding wire 3 thus decoiled is fed to a torch, and the height of the coil 30 is gradually reduced. Simultaneously, the pressing member 10 placed on the coil 30 is lowered. Specifically, the welding wire 3 is first pulled out of the coil 30 along the pressing margin 11 toward the center axis of the coil 30. In this state, the flat portion 10a of the pressing member 10 resides over the position from which the welding wire 3 is decoiled, and the welding wire 3 is pressed from above by the flat surface on the underside of the flat portion 10a, whereby irregular shifting of the position from which the welding wire 3 is decoiled is suppressed.

The welding wire 3 thus decoiled is further pulled out along the pressing margin 11 on the underside of the pressing member 10 toward the center axis of the coil 30. Since the projection 12 is provided on the underside of the pressing member 10 along the inner periphery of the flat portion 10a, the welding wire 3 that has been pulled out of the gap between the inner periphery of the flat portion 10a and the outer periphery of the inner shell 2a rides over the projection 12 of the pressing member 10 from below. In this state, the projection 12 presses the welding wire 3 in an obliquely outward direction from the side thereof near the center axis of the coil 30, whereby irregular shifting of a decoiling path along which the welding wire 3 is decoiled is suppressed.

Thus, the welding wire 3 is pressed at two points on the underside of the pressing member 10 along the decoiling path, i.e., at the position of the coil 30 from which the welding wire 3 is decoiled and the position at which the projection 12 is provided. Therefore, even if the welding wire 3 continues to be decoiled and the position of the coil 30 from which the welding wire 3 is decoiled is shifted in the peripheral direction of the coil 30, the decoiled portion of the welding wire 3 is prevented from behaving irregularly.

In a welding-wire-storing pail pack including a known pressing member 10, when the welding wire 3 is decoiled, the welding wire 3 behaves irregularly at the position of the coil 30 from which the welding wire 3 is decoiled. Accordingly, the decoiled portion of the welding wire 3 may further decoil other portions of the welding wire 3 remaining on the outside in the radial direction of the coil 30 and/or on the lower side in the axial direction of the coil 30 by one or more turns, causing the welding wire 3 to come off the coil 30. In contrast, the pressing member 10 according to the first embodiment assuredly presses the welding wire 3 that is being decoiled and prevents the decoiling path from shifting irregularly, whereby the occurrence of come-off of the welding wire 3 is prevented. Consequently, the welding wire 3 is prevented from being tangled and/or kinked, and the occurrence of decoiling failure is prevented. Furthermore, a sufficient gap of 10 mm or larger provided between the inner shell 2a and the flat portion 10a effectively prevents the occurrence of a situation where the welding wire 3 is bound around the inner shell 2a because the distance between the pulled-out portion of the welding wire 3 and the inner shell 2a is reduced.

In the first embodiment, since the weight of the pressing member 10 is set so as to be within an appropriate range, the welding wire 3 is pressed from above with an appropriate force while the welding wire 3 is prevented from undergoing plastic deformation because of an excessive pressing force that may be applied thereto when the welding wire 3 is decoiled. Furthermore, if the projection 12 has a curved projecting surface, the welding wire 3 is pulled out upward while being in surface contact with the curved projecting surface of the projection 12. Thus, the welding wire 3 is more assuredly pressed by the pressing member 10.

The pressing member 10 according to the first embodiment may be provided with weights on the flat portion 10a thereof. Thus, the behavior of the pressing member 10 while the welding wire 3 is being decoiled is stabilized. In such a case, more than a few weights, rather than three or four weights, are preferably provided evenly over the entirety of the flat portion 10a of the pressing member 10 so that the pressing force applied by the pressing member 10 is not locally increased. Alternatively, an annular weight may be provided in such a manner as to cover the entirety of the upper surface of the flat portion 10a. To increase the weight of the pressing member 10, the thickness of the flat portion 10a may be increased, instead of providing weights on the flat portion 10a. The pressing member 10 may also be provided in the flat portion 10a thereof with a hole through which the state of the coil 30 therebelow can be observed.

Figure 2A:
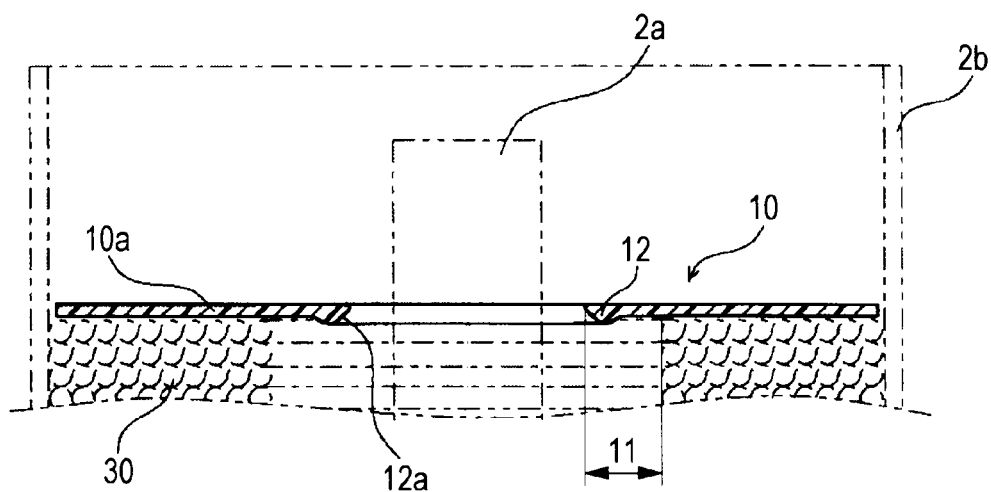
FIGS. 2A and 2B are cross-sectional views showing a pressing member included in a welding-wire-storing pail pack according to a second embodiment of the present invention.
Figure 2B:
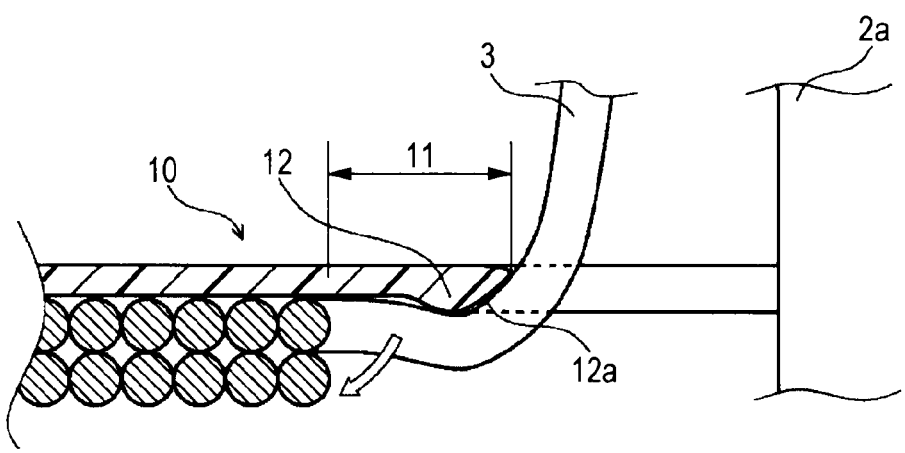

A pressing member according to a second embodiment of the present invention will now be described. FIGS. 2A and 2B are cross-sectional views showing a pressing member 10 included in a welding-wire-storing pail pack according to the second embodiment. FIG. 2A shows the entirety of the pressing member 10. FIG. 2B is an enlarged view of a projection 12 in a state where welding wire is being pulled out. As shown in FIGS. 2A and 2B, the pressing member 10 according to the second embodiment is obtained by providing a sloping surface 12a on the inner periphery of the projection 12 of the pressing member 10 according to the first embodiment, the sloping surface 12a sloping such that the inner diameter of the projection 12 is gradually reduced from the bottom to the top.

In the second embodiment, the working efficiency in decoiling the welding wire 3 is improved by providing the sloping surface 12a on the inner periphery of the projection 12 of the pressing member 10 for preventing the occurrence of come-off of the welding wire 3. The welding wire 3 that is pulled out of the gap between the inner shell 2a and the flat portion 10a comes into contact with the projection 12, whereby the direction of the decoiling path is shifted from the radial direction toward the center of the coil 30 to the axial direction of the coil 30 toward the upper side. With the shifting of the decoiling path, friction occurs between the welding wire 3 and the projection 12, and a stress is applied to the welding wire 3 in a direction obliquely from above toward the center axis of the coil 30. In the second embodiment, since the sloping surface 12a is provided on the inner periphery of the projection 12, the frictional force occurring at the contact between the welding wire 3 and the projection 12 is reduced, and the stress acting in the direction obliquely from above toward the center axis of the coil 30 is also reduced. Therefore, the direction in which the welding wire 3 is decoiled is shifted smoothly, improving the working efficiency in decoiling the welding wire 3. If the projection 12 according to the second embodiment also has a curved projecting surface, the welding wire 3 is more assuredly pressed by the pressing member 10.

Furthermore, since the stress applied from the projection 12 to the welding wire 3 is reduced, the plastic deformation of the welding wire 3 that may occur when the welding wire 3 rides over the projection 12 is more effectively prevented. Consequently, the occurrence of a situation where the welding wire 3 is bound around the inner shell 2a because the welding wire 3 is bent unevenly is prevented.

Furthermore, since the pressing member 10 according to the second embodiment covers most area of the top of the coil 30, entrance of moisture into the coil 30 is suppressed. Thus, a secondary benefit of superior rustproofness of the welding wire 3 is also provided.

In addition, the configuration of the pressing member 10 according to the second embodiment may be changed in various ways likewise in the first embodiment.

Figure 3:
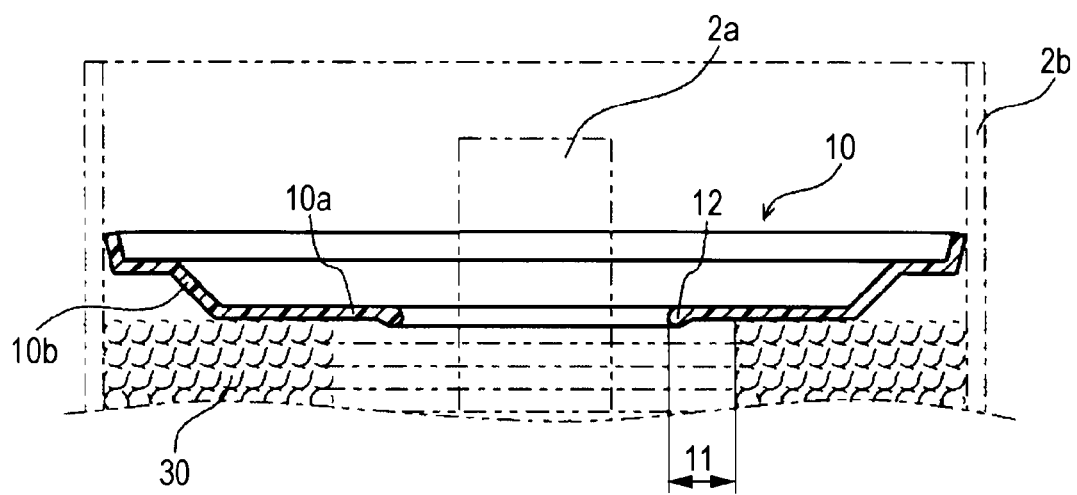
FIG. 3 is a cross-sectional view showing a pressing member included in a welding-wire-storing pail pack according to a third embodiment of the present invention.
Figure 4A:
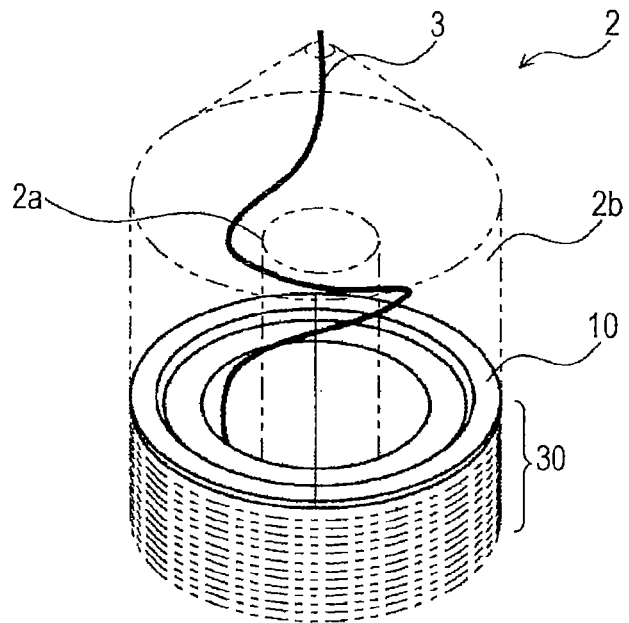
FIGS. 4A and 4B are a schematic perspective view and a vertical cross-sectional view, respectively, of a known welding-wire-storing pail pack.
Figure 4B:
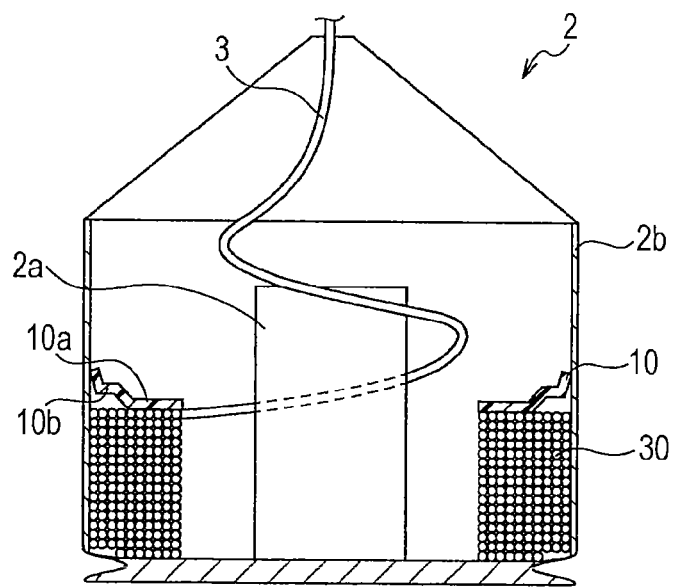
Figure 5:
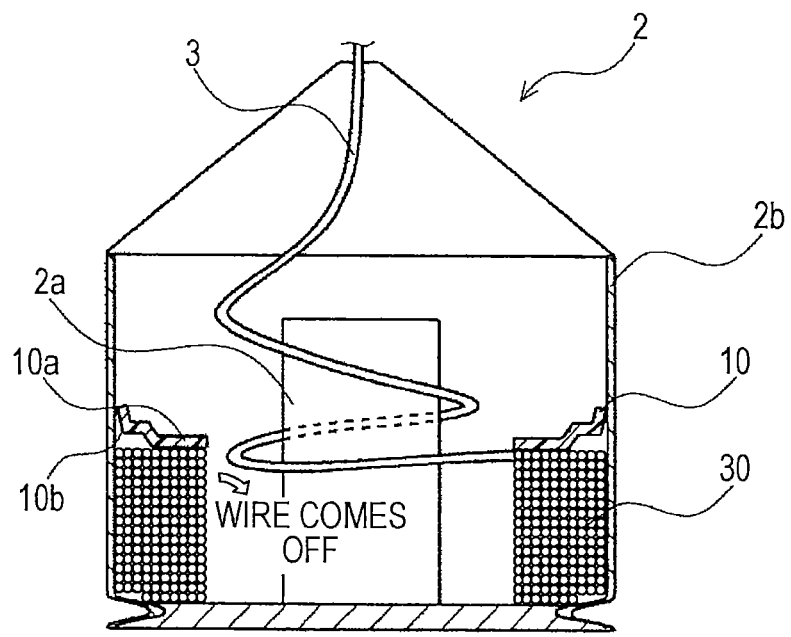
FIG. 5 is a cross-sectional view of the known welding-wire-storing pail pack in a state where wire is being decoiled.
Figure 6A:
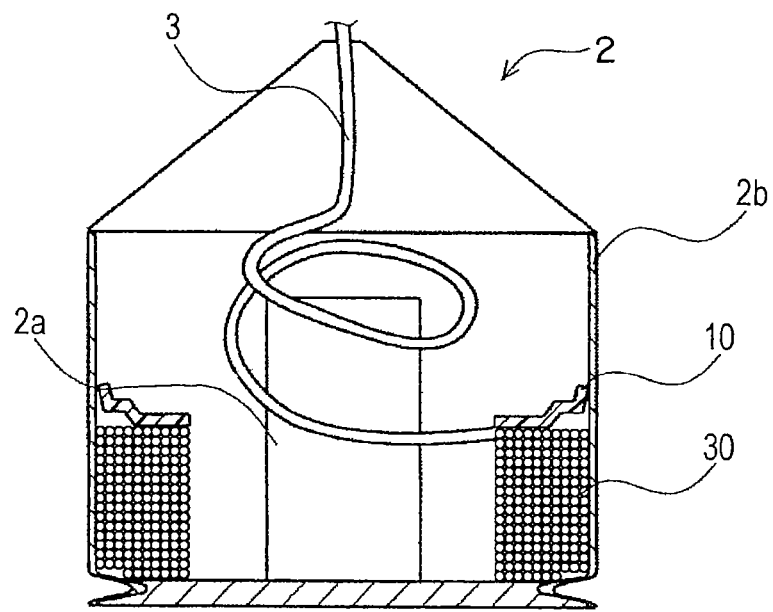
FIGS. 6A and 6B schematically show a process in which a kink occurs in the known welding-wire-storing pail pack.
Figure 6B:
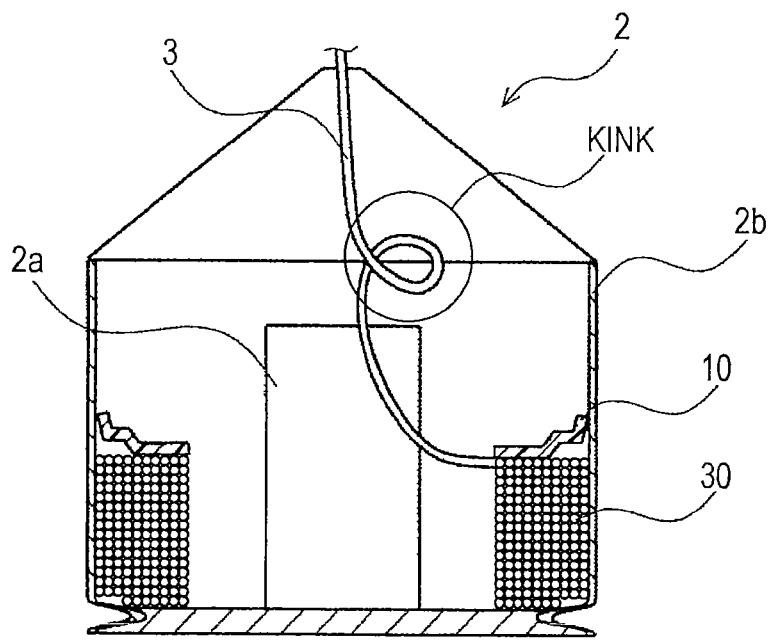
Figure 7A:
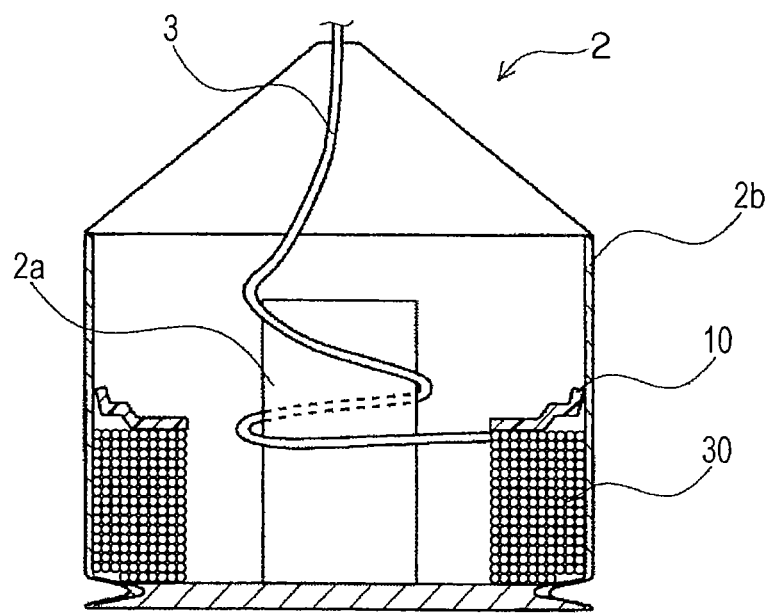
FIGS. 7A and 7B schematically show a process in which wire is bound around an inner shell of the known welding-wire-storing pail pack.
Figure 7B:
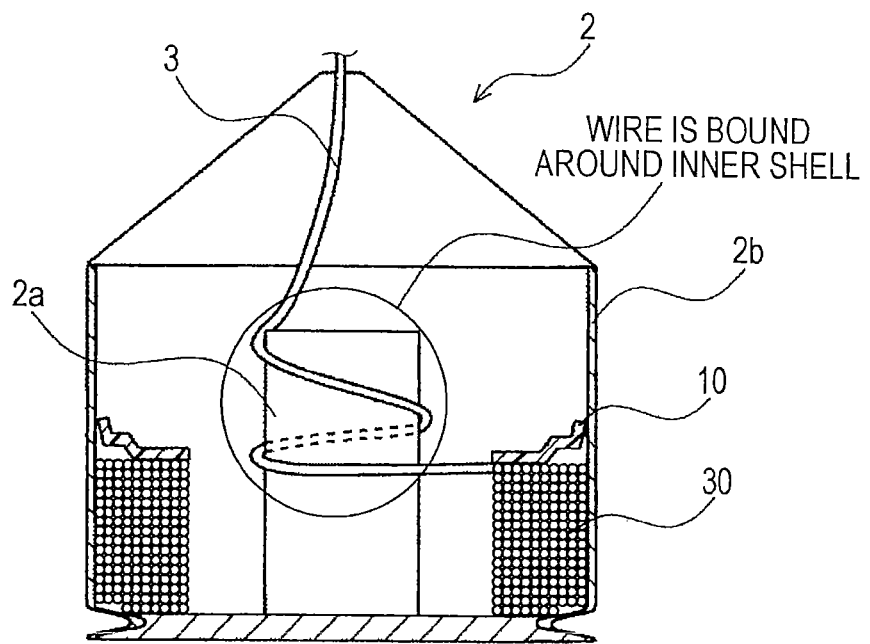
Figure 8:
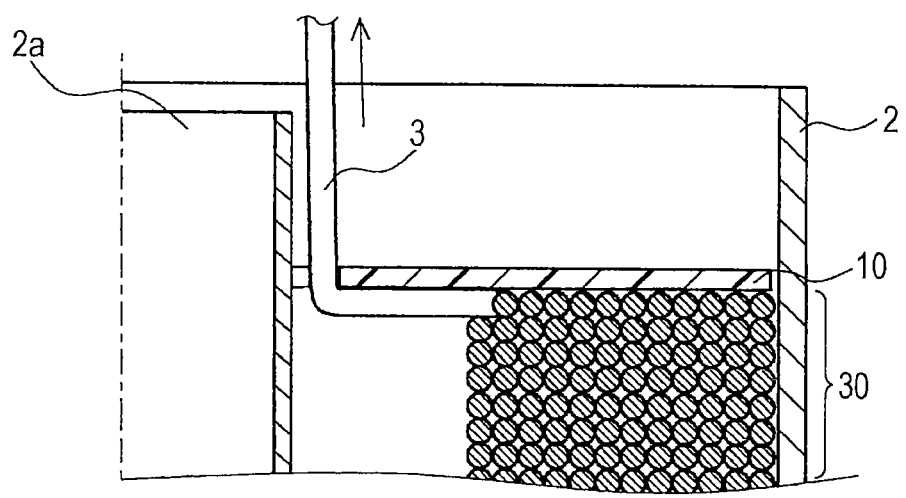
FIG. 8 schematically shows a known technique of preventing welding-wire-decoiling failure.

A pressing member according to a third embodiment of the present invention will now be described. FIG. 3 is a cross-sectional view showing a pressing member 10 included in a welding-wire-storing pail pack according to the third embodiment. As shown in FIG. 3, the pressing member 10 according to the third embodiment is obtained by providing a step-like barrier portion 10b to the pressing member 10 according to the second embodiment in such a manner as to be raised from the outer periphery of the flat portion 10a. The barrier portion 10b, the flat portion 10a, and the projection 12 are provided as an integral mold of olefinic resin, for example. The other details are the same as those in the second embodiment.

The barrier portion 10b has a step-like shape including upper and lower portions and a landing interposed therebetween. The lower portion has a smaller diameter than the upper portion. The upper and lower portions of the barrier portion 10b are not necessarily be perpendicular to the flat portion 10a, with the diameters thereof each increasing toward the top, thereby being inclined outward.

The pressing member 10 according to the third embodiment has the barrier portion 10b. Therefore, in addition to the effects produced in the first and second embodiments, the welding wire 3 is prevented from jumping over the pressing member 10 from the gap between the pressing member 10 and the outer shell 2b even if the welding wire 3 behaves irregularly while the welding wire 3 is being decoiled. That is, as the welding wire 3 is decoiled, the pressing member 10 is gradually lowered, following the change in the height of the coil 30. In such a situation, there is only a gap of, for example, 0.5 to 5.0 mm between the upper portion of the barrier portion 10b of the pressing member 10 and the outer shell 2b in the third embodiment, and the pressing member 10 is therefore lowered in such a manner as to substantially slide on the inner periphery of the outer shell 2b. Since the barrier portion 10b raised from the outer periphery of the flat portion 10a and having an annular shape is substantially in contact with the inner surface of the outer shell 2b, the welding wire 3 is prevented from jumping out of the gap between the pressing member 10 and the outer shell 2b.

With the pressing member 10 according to the third embodiment, if the amount of welding wire 3 remaining becomes small and the height of the coil 30 is reduced to a level below the caulked portion, the lower portion of the pressing member 10 sinks into a space enclosed by the caulked portion. Therefore, the pressing member 10 can still press the top of the coil 30 placed below the caulked portion. Thus, even if the amount of welding wire 3 remaining in the pail pack container 2 becomes small, the pressing member 10 can assuredly press the coil 30, and the welding wire 3 can be decoiled smoothly to the bottommost layer without being tangled and/or kinked.

The pressing member 10 according to the third embodiment may also be provided with weights on the flat portion 10a thereof, whereby the behavior of the pressing member 10 when the welding wire 3 is decoiled can be stabilized. Also in the third embodiment, more than a few weights, rather than three or four weights, are preferably provided evenly over the entirety of the flat portion 10a of the pressing member 10 so that the pressing force applied by the pressing member 10 is not locally increased. Alternatively, an annular weight may be provided in such a manner as to cover the entirety of the upper surface of the flat portion 10a. Particularly in the third embodiment, the annular weight may be provided on the landing of the barrier portion 10b. To increase the weight of the pressing member 10, the thickness of the flat portion 10a may be increased, instead of providing weights on the flat portion 10a. The pressing member 10 may also be provided in the flat portion 10a thereof with a hole through which the state of the coil 30 therebelow can be observed.

EXAMPLES

Benefits brought by the pressing members 10 according to the embodiments of the present invention will now be described in comparison with comparative examples. As the pail pack container 2, two kinds of containers, specifically, a container A (having an inner diameter of 500 mm, a height of 820 mm, and an inner-shell height of 765 mm) and a container B (having an inner diameter of 650 mm, a height of 770 mm, and an inner-shell height of 715 mm), were prepared. Welding wire (JIS Z 3322 YGW18, having a diameter of 1.2 mm) was dropped, in such a manner as to make loops, into the space between the inner shell and the outer shell of each of the containers A and B while the welding wire was twisted by 360 degrees per turn, whereby coils of welding wire were produced. For the container A, the welding wire was coiled until the coil weighed 300 kg. For the container B, the welding wire was coiled until the coil weighed 400 kg. Various kinds of pressing members having different weights and different flat-portion inner diameters were placed on each of the coils of welding wire, whereby different kinds of welding-wire-storing pail packs were obtained as working examples and comparative examples. The outer diameters of the inner shells of the pail packs were varied with the pressing members, whereby the gap between the flat portion and the inner shell was adjusted. Table 1 summarizes the inner diameter of the container, the weight of the pressing member, the inner diameter of the flat portion, the outer diameter of the inner shell, and the presence/absence of the projection for each of the welding-wire-storing pail packs of the working examples and comparative examples.

Table 1

For each of the welding-wire-storing pail packs of the working and comparative examples, the welding wire was decoiled from the topmost turn, and automatic $CO_2$ welding was performed. Table 2 summarizes conditions for the welding.

Table 2

The number of occurrences of come-off of the welding wire from the coil was counted for each of the welding-wire-storing pail packs of the working and comparative examples. In a case where any come-off occurred, the length of wire fed from when the come-off occurred until when the normal pull-out state was resumed was measured. In addition, the number of occurrences of tangling and/or kinking of the wire and the occurrence/non-occurrence of meandering of welding beads while the wire was being decoiled were also checked. For each of the working and comparative examples, if no tangling and kinking of the wire did not occur and no meandering of welding beads occurred, the pail pack was determined to be good. Table 3 summarizes the results of the above measurements and evaluations for the working and comparative examples.

Table 3

In each of Working Examples 1 to 10, the weight of the pressing member, the inner diameter of the flat portion, and the gap between the inner periphery of the flat portion and the outer periphery of the inner shell were all within the respective ranges specified in the embodiments of the present invention. Therefore, no tangling and kinking of the wire occurred while the wire was being decoiled, and meandering of welding beads did not occur.

In Comparative Example 11, the weight of the pressing member was below the range specified in the embodiments of the present invention. Therefore, the wire came off the coil many times, and the wire was tangled. In Comparative Example 12, the weight of the pressing member was over the range specified in the embodiments of the present invention. Therefore, the force with which the pressing member pressed the wire was large, and the wire underwent plastic deformation, resulting in the meandering of welding beads. In Comparative Example 13, the inner diameter of the flat portion was below the range specified in the embodiments of the present invention. Although the width of the pressing margin was sufficient, the length of wire fed from when the come-off occurred until when the normal pull-out state was resumed was large, and the wire was tangled. In Comparative Example 14, the inner diameter of the flat portion was over the range specified in the embodiments of the present invention, and the wire that were being decoiled was not pressed sufficiently. Consequently, the wire was tangled.

In Comparative Example 15, the weight of the pressing member and the inner diameter of the flat portion were within the respective ranges specified in the embodiments of the present invention. However, no protrusion was provided. Therefore, the force of pressing the wire was insufficient, and the wire was tangled. In Comparative Example 16, the gap between the outer periphery of the inner shell and the inner periphery of the flat portion of the pressing member was smaller than 10 mm. Therefore, the resistance acting when the wire was decoiled was increased, making the feeding of the wire unstable. Consequently, meandering of welding beads occurred.

In Comparative Example 17, the width of the pressing margin was below the range specified in the embodiments of the present invention. Therefore, the wire that was being decoiled was not pressed sufficiently, and the wire was tangled. In Comparative Example 18, the width of the pressing margin was over the range specified in the embodiments of the present invention. Therefore, the feeding of the wire was unstable, and the meandering of welding beads occurred. In Comparative Example 19, the length of the projection was below the range specified in the embodiments of the present invention. Therefore, the wire came off the coil many times, and the wire was tangled. In Comparative Example 20, the length of the projection was over the range specified in the embodiments of the present invention. Therefore, the feeding of the wire was unstable, and the meandering of welding beads occurred. In Comparative Example 21, the width of the projection was below the range specified in the embodiments of the present invention. Therefore, the wire came off the coil many times, and the wire was tangled. In Comparative Example 22, the width of the projection was over the range specified in the embodiments of the present invention. Therefore, the wire came off the coil many times, and the wire was tangled.

TABLE 1

| | No. | Inner diameter of container mm | Weight of pressing member g | Diameter of wire decoiling hole (Inner diameter of flat portion) mm | Width of pressing margin mm | Outer diameter of inner shell mm | Length of projection mm | Width of projection mm |
|---|---|---|---|---|---|---|---|---|
| Working Example | 1 | 650 | 800 | 450 | 10 | 400 | 0.4 | 3 |
| | 2 | 650 | 1400 | 450 | 10 | 400 | 0.6 | 3 |
| | 3 | 650 | 1900 | 460 | 10 | 400 | 0.8 | 4 |
| | 4 | 650 | 1300 | 430 | 15 | 400 | 0.6 | 3 |
| | 5 | 650 | 700 | 350 | 55 | 300 | 1 | 5 |
| | 6 | 500 | 850 | 340 | 10 | 300 | 0.4 | 2 |
| | 7 | 500 | 800 | 320 | 20 | 300 | 0.4 | 2 |
| | 8 | 500 | 1200 | 330 | 20 | 300 | 0.5 | 3 |
| | 9 | 500 | 1350 | 320 | 20 | 300 | 0.9 | 5 |
| | 10 | 650 | 1800 | 210 | 125 | 180 | 1.2 | 8 |
| Comparative Example | 11 | 650 | <u>550</u> | 460 | 10 | 400 | 0.4 | 3 |
| | 12 | 650 | <u>2100</u> | 460 | 10 | 400 | 0.6 | 3 |
| | 13 | 500 | 1200 | <u>180</u> | 90 | 160 | 0.4 | 3 |
| | 14 | 650 | 1500 | <u>475</u> | 17.5 | 400 | 0.8 | 4 |
| | 15 | 650 | 700 | 450 | 5 | 400 | <u>None</u> | |
| | 16 | 650 | 1000 | <u>408</u> | 26 | 400 | 0.6 | 3 |
| | 17 | 500 | 1300 | 355 | <u>2.5</u> | 300 | 0.8 | 4 |
| | 18 | 650 | 1300 | 220 | <u>140</u> | 160 | 1 | 5 |
| | 19 | 500 | 1000 | 320 | 20 | 300 | <u>0.2</u> | 1.5 |
| | 20 | 650 | 1300 | 430 | 15 | 400 | <u>1.8</u> | 9 |
| | 21 | 650 | 1300 | 430 | 15 | 400 | 0.5 | <u>0.8</u> |
| | 22 | 650 | 1300 | 430 | 15 | 400 | 1.4 | <u>12</u> |

TABLE 2

| | |
|---|---|
| Current | 300 A |
| Voltage | 31 V |
| Length by which wire is made to project | 25 mm |
| Welding speed | 30 cm/min |
| Shielding gas | 100%-$CO_2$ (Flow rate: 25 l/min) |
| Welding method | Bead-on-plate |
| Welding time | 1 h |

TABLE 3

|  | No. | Come-off times/h | Average wire length fed from time of come-off until resumption of normal state m | Tangling/kinking times/h | Meandering of beads | Evaluation |
|---|---|---|---|---|---|---|
| Working Example | 1 | 1 | 0.9 | 0 | Did not occur | Good |
|  | 2 | 0 | — | 0 | Did not occur | Good |
|  | 3 | 0 | — | 0 | Did not occur | Good |
|  | 4 | 0 | — | 0 | Did not occur | Good |
|  | 5 | 1 | 0.6 | 0 | Did not occur | Good |
|  | 6 | 1 | 1.1 | 0 | Did not occur | Good |
|  | 7 | 2 | 1.2 | 0 | Did not occur | Good |
|  | 8 | 0 | — | 0 | Did not occur | Good |
|  | 9 | 0 | — | 0 | Did not occur | Good |
|  | 10 | 0 | — | 0 | Did not occur | Good |
| Comparative Example | 11 | 7 | 7.8 | 2 | Did not occur | No good |
|  | 12 | 0 | — | 0 | Occurred | No good |
|  | 13 | 2 | 4.5 | 1 | Did not occur | No good |
|  | 14 | 15 | Not resumed | 3 | Did not occur | No good |
|  | 15 | 10 | 8.8 | 1 | Did not occur | No good |
|  | 16 | 0 | — | 0 | Occurred | No good |
|  | 17 | 15 | Not resumed | 4 | Did not occur | No good |
|  | 18 | 0 | — | 0 | Occurred | No good |
|  | 19 | 13 | Not resumed | 3 | Did not occur | No good |
|  | 20 | 0 | — | 0 | Occurred | No good |
|  | 21 | 14 | Not resumed | 3 | Did not occur | No good |
|  | 22 | 12 | Not resumed | 2 | Did not occur | No good |

What is claimed is:

1. A welding-wire-storing pail pack comprising:
a container in which an inner shell and an outer shell are coaxially provided on a bottom plate;
a coil of welding wire stored in a space between the inner shell and the outer shell; and
a pressing member provided on the coil of welding wire for preventing the welding wire from jumping when the welding wire is decoiled, due to the weight of the pressing member on the coil,
wherein the welding wire is used by being pulled out of a gap between the pressing member and the inner shell,
wherein the pressing member includes
an annular body positioned on the welding wire;
a pressing margin of the annular body extending from a position on an underside of the annular body at an inner peripheral edge of the coil toward an axis of the coil; and
a projection provided on an inner peripheral edge of the pressing margin in such a manner as to project downward from the pressing margin by a certain length in the direction of the axis of the annular body,
wherein the annular body of the pressing member has an inner diameter of 200 to 470 mm,
wherein the gap has a minimum width of 10 mm,
wherein the pressing member weighs 600 to 2000 g,
wherein the pressing margin has a width of 5 to 135 mm, and
wherein the certain length of the projection is 0.3 to 1.5 mm, and a width of the projection in the direction of the diameter of the annular body is 1 to 10 mm.

2. The welding-wire-storing pail pack according to claim 1, wherein the annular body of the pressing member is flat in the entirety thereof.

3. The welding-wire-storing pail pack according to claim 1, wherein the annular body of the pressing member includes a flat portion and a barrier portion, the barrier portion being raised from an outer periphery of the flat portion and having a step-like shape with a lower portion thereof having a smaller diameter than an upper portion thereof.

4. The welding-wire-storing pail pack according to claim 1, wherein the projection of the pressing member has a curved projecting surface.

5. The welding-wire-storing pail pack according to claim 1, wherein the projection of the pressing member has, on a side thereof nearer a center axis of the coil, a sloping surface whose inner diameter becomes smaller from the bottom to the top thereof in the direction of the axis of the annular body.

6. A pressing member intended for pressing a coiled welding wire stored in a container in which an inner shell and an outer shell are coaxially provided on a bottom plate, wherein the coiled wire is stored between the inner shell and an outer shell, the pressing member comprising:

- an annular body adapted to be positioned on the welding wire, wherein a pressing margin of the annular body extends from a position on an underside of the annular body at an inner peripheral edge of the coil toward an axis of the coil; and
- a projection provided on an inner peripheral edge of the pressing margin in such a manner as to project downward from the pressing margin by a certain length in the direction of the axis of the annular body,
- wherein the annular body of the pressing member has an inner diameter of 200 to 470 mm,
- wherein a gap between the inner periphery of the annular body and the inner shell has a minimum width of 10 mm,
- wherein the pressing member weighs 600 to 2000 g,
- wherein the pressing margin has a width of 5 to 135 mm, and
  - wherein the certain length of the projection is 0.3 to 1.5 mm, and a width of the projection in the direction of the diameter of the annular body is 1 to 10 mm.

\* \* \* \* \*